United States Patent Office 3,399,251
Patented Aug. 27, 1968

3,399,251
ALKYLBENZYL ADDUCTS OF POLYETHYL-
ENEIMINE BLENDED WITH CRYSTAL-
LINE POLYOLEFINS
Robert Miller, Columbia, S.C., and Milton Farber,
Verona, and Frederick C. Loveless, Oakland, N.J.,
assignors to Uniroyal, Inc., a corporation of New
Jersey
No Drawing. Continuation-in-part of application Ser. No.
375,328, June 15, 1964. This application Feb. 1, 1966,
Ser. No. 523,910
7 Claims. (Cl. 260—897)

ABSTRACT OF THE DISCLOSURE

The present invention relates to an alkylbenzyl polyethyleneimine and to a shaped article having a composition comprising an alpha monoolefin polymer blended with an alkylbenzyl adduct of polyethyleneimine which is rendered dyeable with acid type dyes by treating said article with an acidic reagent capable of diffusing into said composition and reacting with said alkylbenzyl adduct of polyethyleneimine.

---

This application is a continuation-in-part of our copending application Ser. No. 375,328, filed June 15, 1964 and now U.S. Patent No. 3,361,843, which is a continuation-in-part of our copending application Ser. No. 290,291 filed June 25, 1963, now abandoned.

The invention relates to a new composition of matter which is an alkylbenzyl adduct of polyethyleneimine, and to a new composition of matter comprising a mixture of fiber-forming hydrocarbon high polymers and these alkylbenzyl adducts of polyethyleneimine.

This invention is also directed to the production of dye-receptive, shaped, hydrocarbon polymers, such as fibers. It is accomplished by means of two successive changes in these shaped polymers: first, incorporation of a minor amount of these inherently dye-receptive, highly-polar, basic alkylbenzyl adducts of polyethyleneimine in the hydrocarbon polymer; and second, treating this mixture with an acidic chemical capable of diffusing into the mass and reacting with the basic polymer. The treated material is thereby made dyeable with anionic dyes by conventional techniques. The invention provides a cheap, practical method of rendering these difficultly dyeable hydrocarbon polymers highly dye-receptive. The dyed articles are colorfast, and intensely and uniformly dyed.

Hydrocarbon polymers, particularly the paraffinic ones, are difficult to dye as they lack the functional groups, known as dye receptors, to which dye molecules may become attached. It is known in the prior art to add dye receptor materials, particularly various nitrogen base polymers, to a fiber either before or after it is extruded, to make it dyeable. However, in such cases, when minor amounts of nitrogen base polymers, i.e., less than 10%, are incorporated in a hydrocarbon polymer fiber, it is undyeable with anionic dyes, i.e., acid dyes, metallized dyes, and direct dyes, except for the production of pale tints. Similarly, treatment of a hydrocarbon polymer fiber containing no nitrogen-base polymer additive with acidic materials produces no increase in dyeability with the above dye classes. We have discovered that when these two techniques are combined, the fiber is made highly dyeable. The present invention has thus produced a result which is totally unexpected and which is unique: mixtures containing very small amounts of dye receptor, amounts which ordinarily confer little or no dyeability, are made very highly dyeable.

Dyeability in difficult-to-dye fibers may be achieved by means of an additive alone, but in these cases it has been necessary to use large quantities of additive, i.e., over 10% With such large amounts of additive present, the resulting fiber suffers great disadvantages: physical properties are degraded; the material, because of incompatibility of the mixed polymers, is difficult or impossible to extrude and process; the fiber is rough and brittle; and the added expense is great. It would thus be highly desirable to be able to achieve dyeability in such fibers with the addition of less than 10% of added basic polymer. Our invention represents a practical method for achieving this end.

The reason for the difficulty in dyeing blends of hydrocarbon polymer with less than 10% of a polar, dye-receptive polymer stems from the fact that the plastic, blended mixtures behave as though the polar polymer had become encapsulated or shielded in some manner, so that water-soluble anionic dyes, comprising the large classes of acid dyes, which includes milling or strong acid dyes, direct dyes, metallized dyes, reactive dyes, etc., cannot penetrate to them. Treatment of these blends with acidic materials according to our invention makes them permeable to the above dyes.

We have discovered that drawn or undrawn fibers and filaments, and yarns and fabrics made therefrom, composed of hydrocarbon polymer material containing from 0.5 to 10% of a polymerized nitrogen base can be made highly receptive to the dyes mentioned above by treating the filamentous material containing such polymer for a short time with certain acidic chemical reagents which are capable of dissolving in or diffusing into the hydrocarbon polymer, where they react with the nitrogen-base polymer therein. The material so treated may then be dyed in any conventional manner with the above-named dyes.

The term "hydrocarbon polymer" is used herein to refer to the matrix material of which the fiber is largely composed. One material used in our invention is polypropylene. However, the invention is equally applicable to all fiber-forming hydrocarbon linear high polymers, including poly-(1-alkenes) such as polyethylene, poly-1-butene, poly(4-methyl-1-pentene), copolymers, including graft and block copolymers, of two or more 1-alkenes or of nonterminal olefins with 1-alkenes, etc., or mixtures of two or more of these copolymers. Physically, these hydrocarbon polymers may take the form of filaments, yarns, fabrics, films, and sheets, or other shaped forms presenting a high ratio of surface to volume.

The dye-receptor polymers which we incorporate in the hydrocarbon polymers are the reaction product of an alkylbenzyl halide and polyethyleneimine, in which the dye-receptor polymer contains at least between 1 and 15% by weight of nitrogen. The nitrogen content of the blend of hydrocarbon polymer and dye-receptor polymer is to be at least 0.1% by weight, and in a preferred embodiment of the invention, between 0.1% and 1.5% by weight.

Polyethyleneimine would seem to be a very desirable additive to render the hydrocarbon polymer dye-receptive because it contains more nitrogen atoms per unit weight than other nitrogen polymers such as polyvinylpyridine, amide polymers, other amine polymers aside from polyethyleneimine or virtually any other nitrogen-containing polymer. However, polyethyleneimine is too water-soluble to withstand the acid pre-treatment of our invention and the subsequent acidic dyeing process. We have discovered that the substitution by an alkaryl group of an hydrogen atom on all or part of the polyethyleneimine nitrogen atoms results in a polymer which is insoluble in water, and wil not be completely leached out of the blend with the hydrocarbon polymer by the aforementioned acidic processing. Mere addition of alkaryl groups, however, can lower the nitrogen content of the modified polyethyleneimine to the point where it is a poor dye-receptor. Our invention provides a balance of properties combining high nitrogen content with low leachability with water and good compatibility with the hydrocarbon polymers. We have determined that the size of the alkyl group and the degree of substitution upon the nitrogen atom are of great importance in attaining this balance of properties. If the alkyl group is too small or the degree of substitution too low, the polymer compound is not only leachable from the blend with acid, thereby resulting in loss of dyeability, but in addition, is not sufficiently compatible with the hydrocarbon polymer, causing poor extrudabiluty and degradation of the physical properties of the fiber or other shaped article. If the alkyl group is too large, or the degree of substitution is too high, there will be too few nitrogen atoms per unit of weight which will result in poor dyeability due to lack of sufficient dye-receptor sites. These considerations taken together result in the previously mentioned range of nitrogen contents of the dye-receptor polymer and of the final blend.

We have found that if the alkyl group contains from 6 to 20 carbon atoms and preferably from 8 to 12 carbon atoms, none of the adverse effects listed above occur. The degree of substitution upon the nitrogen atoms can vary from 15 to 100%, depending upon the size of the alkyl group and the final nitrogen percentage desired. The alkyl group can be a straight chain, branched or cyclic hydrocarbon.

The structural formula of those repeating units of polyethyleneimine which are substituted with the alkyl-benzyl groups is:

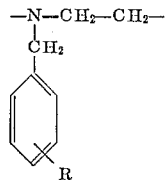

where R represents an alkyl group having from six to twenty carbon atoms.

U.S. Patent 3,134,740 discloses the use of cross-linked alkenylbenzyl polyethyleneimine as a chelating resin. This resin is not usable to enhance the dyeability of hydrocarbon polymers since it is cross-linked and is thus incompatible (i.e., not mutually soluble) with them. Using incompatible additives such as these, it would be impossible, for instance, to extrude a fiber satisfactorily.

U.S. Patent 2,272,489 discloses that an alkyl polyethyleneimine increases the affinity of rayon to dyestuffs. The products of this patent are of extremely limited utility and differ from the present invention in that: (a) the patent teaches the use of water-soluble polymers and does not point out their undesirability; polymers are in the spinning bath rather than incorporated in the hydrocarbon polymer; (c) the rayon mentioned in the patent is a completely different polymer than the hydrocarbon polymers used in this invention. Rayon, of course, does not require the acid pretreatment prior to dyeing required by the polymers of our invention. An additional point of difference, and probably the most crucial, is that U.S. 2,272,489 does not teach the necessity and advantages of combining maximum nitrogen content with good compatibility and low leachability.

The dye-receptive alkylbenzyl polyethyleneimine compound is prepared by the reaction between an alkylbenzyl halide, in which the alkyl group may be chosen from the homologous series from hexyl to eicosyl, and polyethyleneimine. The halogen of the halide can be bromine, chlorine or iodine. The polyehyleneimine should have a minimum molecular weight of about 10,00. A polar solvent such as an alcohol, dioxane, or aqueous solutions of these, may be used as the reaction medium. The product is formed by heating the reaction mixture and then adding a strong alkalai such as sodium hydroxide or potassium hydroxide to liberate the free base form of the polymer. The reaction mixture is then poured into water or some other suitable precipitant and the final product filtered and dried.

Preparation of the alkylbenzyl-substituted polyethyleneimine can be more adequately illustrated using the following working examples.

EXAMPLE 1

60.2 g. (0.7 mols) of 50% aqueous polyethyleneimine (molecular weight: 30,000) was added to 59 g. (0.2 mol) of dodecylbenzyl chloride in 400 ml. of isopropanol. The mixture was brought to reflux (80° C.) over a 15 minute period and then heated at reflux for 2 hours under nitrogen atmosphere. A slurry consisting of 12 g. of sodium hydroxide in 15 ml. of water and 15 ml. of isopropanol was added to the reaction mixture and the heating continued for an additional hour. The mixture was then poured into water and filtered to obtain a dodecylbenzyl adduct of polyethyleneimine containing 8.2% by weight nitrogen (28.6% of the nitrogen atoms substituted), which was dried in a vacuum oven at 60° C.

EXAMPLE 2

51.6 g. (0.6 mol) of 50% aqueous polyethyleneimine (molecular weight: 30,000) was added to 88.4 g. (0.3 mol) of dodecylbenzyl chloride in 400 ml. of isopropanol. The reaction mixture was brought to reflux (80° C.) and the mixture was then refluxed at this temperature for 2½ hours. A slurry consisting of 15 g. of sodium hydroxide in 20 ml. of water and 150 ml. of isopropanol was added to the reaction mixture and the refluxing was continued for one additional hour. The mixture was then poured into water and filtered to obtain a dodecylbenzyl polyethyleneimine in which 50% of the nitrogen atoms were substituted, which was then dried in a vacuum oven at 60°.

EXAMPLE 3

60.2 g. (0.7 mol) of 50% aqueous polyethyleneimine (molecular weight 50,000) is added to 66.4 g. (approximately 0.315 mol) of n-hexylbenzyl chloride in 400 ml. of ethanol. The procedure set forth in Example 1 is followed to obtain a hexylbenzyl polyethyleneimine in which about 45% of the nitrogen atoms are substituted.

EXAMPLE 4

The same procedure is used as set forth in Example 3 with the exception that 51.6 g. of 50% aqueous polyethyleneimine (0.6 mol) and 73.9 g. (approximately 0.36 mol) of hexylbenzyl chloride are used to obtain a hexylbenzyl polyethyleneimine in which 60% of the nitrogen atoms are substituted.

EXAMPLE 5

51.6 (0.6 mol) of 50% aqueous polyethyleneimine (molecular weight 50,000) is added to 43.0 g. (0.18 mol) of isoctylbenzyl chloride in 400 ml. of dioxane. A procedure like that set forth in Example 1 is followed to obtain an isoctylbenzyl polyethyleneimine in which about 30% of the nitrogen atoms are substituted.

EXAMPLE 6

A similar procedure is used as set forth in Example 5 with the exception that 64.4 g. (approximately 0.27 mol) of octylbenzyl chloride is used to obtain an octylbenzyl-polyethyleneimine in which about 45% of the nitrogen atoms are substituted.

EXAMPLE 7

51.6 g. (0.6 mol) of 50% aqueous polyethyleneimine (molecular weight 30,000) is added to 45.6 g. approximately 0.18 mol) of nonylbenzyl chloride in 400 ml. of isopropanol. The procedure set forth in Example 1 is followed to obtain a nonylbenzyl polyethyleneimine which is about 30% substituted.

EXAMPLE 8

The procedure set forth in Example 7 is followed with the exception that 67 g. (approximately 0.27 mol) of nonylbenzyl chloride was used to obtain a nonylbenzyl polyethyleneimine in which approximately 45% of the nitrogen atoms are substituted.

EXAMPLE 9

60.2 grams (0.7 mol) of 50% aqueous polyethyleneimine (molecular weight 30,000) is added to 41.7 g. (approximately 0.11 mol) of octadecylbenzyl chloride in 400 ml. of dioxane. The procedure set forth in Example 1 is followed to obtain an octadecylbenzyl polyethyleneimine in which about 15% of the nitrogen atoms are substituted.

EXAMPLE 10

The procedure set forth in Example 9 is followed with the exception that 79.6 g. (approximately 0.21 mol) of octadecylbenzyl chloride is used to obtain an octadecylbenzyl polyethyleneimine in which about 30% of the nitrogen atoms are substituted.

The mixtures of hydrocarbon polymer and alkylbenzyl polyethyleneimine polymer are made by blending, tumbling, or any convenient mixing method so that they can be made into the shaped article or spun into yarn by a conventional melt spinning process. In order to increase the orientation and produce the desired combination of strength and elongation properties in the yarn, the fibers are drawn in a hot air oven after spinning. The treatment with the acidic reagent may be affected either before or after the yarn has been drawn, although it is most conveniently done after drawing.

As has been noted above it is necessary to treat the mixture of hydrocarbon polymer and nitrogen polymer with an acidic chemical reagent to make it dye receptive. Examples of the introfusible acidic chemical reagents used in the invention are the following:

(1) Mineral acids, such as hydrochloric acid, hydrobromic acid, sulfurous acid, nitric acid, sulfuric acid, phosphoric acid and perchloric acid. (The last three acids, highly ionic materials, are effectively employed at high application temperatures (>60° C.) as shown hereinafter.

(2) The anhydrous acid gases corresponding to the mineral acids defined above, whether the undissociated acid or the acid anhydride, illustrated by hydrogen chloride, hydrogen bromide, sulfur dioxide, and nitrogen dioxide. A source of hydrogen ions such as water in or on the hydrocarbon polymer is essential in those cases where the reagent is not a proton-donating compound.

(3) Organo-carboxylic acids, including aliphatic and aromatic acids, mono-carboxylic and dicarboxylic acids, saturated and unsaturated acids. Suitable acids are exemplified by formic, acetic, propionic, stearic, and other alkanoic acids in the $C_{1-18}$ range; undecylenic, oleic, benzoic, salicyclic, succinic, adipic, phthalic, bromoacetic, chloroacetic and lactic acids. The organic acid may be used in its liquid or molten state (when its melting point is below the temperature selected for the fiber treatment), or in solution in a volatile organic solvent such as benzene or toluene. It may be used in water solution—provided that the acid is used at a concentration at which the dye uptake by articles treated in accordance with the invention is significantly increased.

(4) Those halide compounds which liberate hydrohalic acid on contact with water at the temperature of the treatment. Examples of such compounds are:

(a) Halides, including oxyhalides, of nonmetallic elements such as phosphorus and sulfur (exemplified by $PCl_3$, $POCl_3$, $S_2Cl_2$, $SOCl_2$, $SO_2Cl_2$);

(b) Metal halides such as the halides of zinc, tin, and aluminum;

(c) Acid halides of organic acids of the class defined in section (3) and organosulfonyl halides, typified by acetyl, benzoyl, adipoyl, and p-toluenesulfonyl chlorides;

(d) Activated alkyl halides containing a conjugated grouping which enhances the reactivity of the halogen atom; e.g., allylic and benzylic halides (such as chlorides).

(5) Other acidic and potentially acidic compounds capable of forming complexes or addition compounds with basic nitrogen polymers, e.g., boron trifluoride, n-butyl borate, and phenol.

In all these treatments, hydrogen ions are present either as part of the acid itself, as in nitric or acetic acid, or they may be furnished by water, in or on the fiber, in the amount of at least 1% (OWF).

Representative of those reagents which have the greatest effect in the process of our invention, from the standpoint of increasing the dyeability of hydrocarbon polymers containing up to 10% of an alkylbenzyl polyethyleneimine are: phosphorus pentachloride, sebacoyl chloride, hydrochloride acid, and chloroacetic acid.

The temperature range within which our chemical treatment of the shaped polymer-blend material is carried out is not critical but is of course below the softening temperature of the particular hydrocarbon polymer employed. For polypropylene this would be below 160° C., its melting point. In practice, however, with drawn fibers of polypropylene, for instance, which shrink greatly at temperatures above 140° C., temperatures not greater than 140° C. will of course be used to avoid such shrinkage. There is likewise no critical lower limit, but the lowest useful temperature will simply be dictated by rates of diffusion and reaction, and in many cases 0° C. represents a practical lower value.

The duration of the acid treatment may vary from less than 1 second up to 3 hours, depending on the reagent and the temperatures selected. Usually a time of from 5 seconds to 30 minutes, using temperatures in the range from about 20° to about 140 °C., is satisfactory and sufficient for most reagents and solutions.

The physical form of the polymer-blend shaped objects on which these treatments is carried out may vary widely. As fiber, this can be monofilament or multifilament; plain, bulked, or textured; staple; tow, or stock. It may be films, sheets or fabrics. The treatment may be done batchwise or in any convenient continuous fashion. A number of efficient and practical techniques will readily suggest themselves to those skilled in the art.

Although our invention is applicable in the range of 0.5 to 10% content of the nitrogen base polymer in the fiber, we prefer to employ the range of 2–5%, the particular value depending upon the nitrogen content of the alkylbenzyl-substituted polyethyleneimine. This lower range is advantageous because of the high cost of the nitrogen base polymers and because it minimizes any undesirable effects on the physical properties of the fiber. The presence of 2 to 5% of nitrogen base polymer is usually sufficient to exhaust a 1% (OWF) dye bath, which gives deep colors with many dyes.

The yarn is immersed in a dye bath which can contain, for instance, Capracyl Orange R (Acid Orange 60), a premetallized dye, or Alizarin Sky Blue B (Acid Blue 78), a milling acid dye. However, any other suitable dye may be used. Thus the fiber treated according to the invention is highly dyeable with all dyes in the aniomic or acid class, including dyes such as Reactone Red 2B (Geigy), a reactive dye, Pontamine Fast Yellow 4GL (Direct Yellow 44), a direct dye and Alizarin Red S (Mordant Red 3), a mordant acid dye. The fibers can also be dyed with disperse dyes.

The method of making a polymer containing an alkylbenzyl polyethyleneimine, and polypropylene into a fiber, drawing said fiber, and activating it with an acidic compound before subjecting it to a dye bath treatment can be more adequately illustrated using the following working example.

EXAMPLE 11

Each of the alkylbenzyl polyethyleneimine adducts made in Examples 1–10 of this specification is mixed with isotactic polypropylene having an intrinsic viscosity of 2.0 in tetrahydronaphthalene at 135° C. A ratio of from 3 to 5 parts of alkylbenzyl polyethylene imine to 100 parts of the polypropylene compound is used. Each mixture is milled at a temperature of about 340° F., cooled on Dry Ice and ground to pass through a 1/16 inch screen. The resultant powder is placed in an extruder, heated to a plastic state and melt spun through an 8 filament spinneret to obtain a 350–400 denier yarn.

The multifilament yarn is drawn through a hot air oven at a temperature of 275° F. The ratio between let-off roll and the take up roll is about 1 to 4 in each case.

Fourteen one-half gram samples are taken from each of the ten polypropylene-alkylbenzyl polyethyleneimine samples of drawn yarn made in Example 11. The samples are activated with the acidic reagents and under the conditions indicated in Table I and are dyed with a 2% (OWF) Capracyl Orange R solution for 60 minutes at 90–95° C. The results of this are set forth in Table I as follows:

Blend 10 is 100 parts polypropylene and 4 parts octadecylbenzyl polyethyleneimine (30% substituted).

In this specification, the concentration of acid in the dye bath is conveniently expressed as "percent OWF" or percent on weight of fiber, i.e., the weight of acid in the dye bath is expressed as the percentage of the weight of fiber which is being dyed therein.

Having thus described our invention, what we claim and desire to protect by Letters Patent is:

1. A composition of matter comprising a mixture of a substantially crystalline alpha monoolefin polymer and between about 0.5% and 10% of a substantially water insoluble reaction product of an alkylbenzyl halide, with polyethyleneimine in which said alkyl group contains from 6 to 20 carbon atoms.

2. The composition of claim 1 in which the polyethyleneimine is from 15% to 60% N-alkylbenzyl substituted.

3. A shaped article having the composition of claim 1 wherein said water insoluble reaction product is the N-dodecylbenzyl adduct of polyethyleneimine.

4. A shaped article having the composition of claim 1 wherein said alpha monoolefin polymer is polyethylene, polypropylene or poly(4-methyl-1-pentene).

TABLE I.—DEPTH OF COLOR AFTER DYEING WITH CAPRACYL ORANGE R (2% OWF)

| Activating Reagent | Temp. (° C.) | Time (min.) | Blend | | | | | | | | | |
|---|---|---|---|---|---|---|---|---|---|---|---|---|
| | | | 1 | 2 | 3 | 4 | 5 | 6 | 7 | 8 | 9 | 10 |
| Unactivated | | | (1) | (1) | (1) | (1) | (1) | (1) | (1) | (1) | (1) | (1) |
| PCl₃ | 60 | 2 | Deep | Medium | Deep | Medium | Deep | Deep | Deep | Deep | Deep | Medium |
| Acetic Acid | 60 | 2 | Light | Light | Medium | Light | Medium | Light | Medium | Light | Medium | Light |
| Sebacoyl chloride | 60 | 2 | Deep | Deep | Deep | Deep | Deep | Deep | Deep | Deep | Deep | Deep |
| n-Butyl borate | 60 | 2 | Medium | Light | Light | Light | Medium | Medium | Medium | Light | Light | Light |
| HCl | 50 | 2 | Deep | Medium | Deep | Deep | Deep | Deep | Deep | Deep | Deep | Medium |
| Monochloro acetic acid | 70 | 2 | do | Deep | do | do | do | do | do | Medium | do | Do. |
| Dichloro acetic acid | 70 | 2 | do | do | do | do | do | do | do | Deep | do | Deep |
| Propionic acid | 100 | 2 | Medium | Medium | Medium | Medium | Medium | Medium | Medium | Medium | Medium | Medium |
| Formic acid | 90 | 2 | do | do | Deep | do | Deep | do | Deep | do | Deep | Do. |
| Benzoyl chloride | 70 | 2 | Deep | Deep | do | Deep | do | Deep | do | Deep | do | Deep |
| Toluene sulfonyl chloride | 70 | 2 | do | Medium | do | do | do | do | do | do | do | Medium |
| H₂SO₄ | 140 | 2 | do | do | Medium | Medium | do | do | do | Medium | Medium | Do. |
| H₃PO₄ | 140 | 2 | do | do | do | do | do | do | do | do | do | Light |

¹ Almost Colorless.

Note: The following is a breakdown on the composition of each blend listed in Table I.

Blend 1 is 100 parts polyproylene and 3 parts dodecylbenzyl polyethyleneimine (28.6% substituted)

Blend 2 is 100 parts polypropylene and 5 parts dodecylbenzyl polyethyleneimine (50% substituted)

Blend 3 is 100 parts polypropylene and 4 parts hexylbenzyl polyethyleneimine (45% substituted)

Blend 4 is 100 parts polypropylene and 5 parts hexylbenzyl polyethyleneimine (60% substituted)

Blend 5 is 100 parts polypropylene and 3 parts octylbenzyl polyethyleneimine (30% substituted)

Blend 6 is 100 parts polypropylene and 4 parts octylbenzyl polyethyleneimine (45% substituted)

Blend 7 is 100 parts polypropylene and 3 parts nonylbenzyl polyethyleneimine (30% substituted)

Blend 8 is 100 parts polypropylene and 4 parts nonylbenzyl polyethyleneimine (45% substituted)

Blend 9 is 100 parts polypropylene and 3 parts octadecylbenzyl polyethyleneimine (15% substituted).

5. A shaped article having the composition of claim 1 which contains the products of interaction of said water insoluble reaction product with an acidic reagent, said acidic reagent being introduced into said alpha monoolefin polymer after shaping.

6. A fiber having the composition of claim 5, wherein said alpha monoolefin is polypropylene and said water insoluble reaction product is N-dodecylbenzyl polyethyleneimine.

7. The fiber of claim 6 which is 15% to 60% N-dodecylbenzyl substituted.

References Cited

UNITED STATES PATENTS

| | | | |
|---|---|---|---|
| 3,107,228 | 10/1963 | Cappuccio et al. | 260—897 |
| 3,134,740 | 5/1964 | Sheetz | 260—2.1 |
| 3,230,029 | 1/1966 | Cappuccio et al. | 8—55 |
| 3,258,449 | 6/1966 | Heuck et al. | 260—45.95 |

GEORGE F. LESMES, *Primary Examiner.*